United States Patent [19]

Sarnoff et al.

[11] Patent Number: 4,852,760
[45] Date of Patent: Aug. 1, 1989

[54] OVEN PAN HOLDER AND COMBINATION OF OVEN PAN HOLDER WITH OVEN PAN

[75] Inventors: Norton Sarnoff, Northbrook; Carl R. Fletcher, Arlington Heights, both of Ill.

[73] Assignee: Ensar Corporation, Wheeling, Ill.

[21] Appl. No.: 223,799

[22] Filed: Jul. 25, 1988

Related U.S. Application Data

[63] Continuation-in-part of Ser. No. 603,781, Apr. 25, 1984, Pat. No. 4,817,812.

[51] Int. Cl.$^4$ .................. B65D 90/04; B65D 90/12
[52] U.S. Cl. .................. 220/85 H; 220/19; 220/401; 220/405; 220/94 A; 229/3.5 MF; 294/32; 294/172
[58] Field of Search ............ 220/19, 85 H, 94 A, 220/401, 405; 229/1.5 H, 3.5 MF; 249/27.1, 32, 172

[56] References Cited

U.S. PATENT DOCUMENTS

| | | | |
|---|---|---|---|
| 240,891 | 5/1881 | Cook | 220/85 H |
| 391,524 | 10/1888 | Farrell | 220/85 H |
| 639,150 | 12/1899 | Cooney | 220/19 |
| 944,777 | 12/1909 | Feldman . | |
| 995,486 | 6/1911 | Schaumburg . | |
| 1,097,398 | 5/1914 | Dennis . | |
| 1,098,053 | 5/1914 | Porter | 220/401 |
| 1,101,583 | 6/1914 | Summers | 220/401 |
| 1,257,119 | 2/1918 | Reynolds . | |
| 1,265,611 | 5/1918 | Clarke . | |
| 1,344,802 | 6/1920 | Lackner | 229/1.5 H |
| 1,385,841 | 7/1921 | Melish . | |
| 2,139,598 | 12/1938 | McMullen . | |
| 2,673,806 | 3/1954 | Colman . | |
| 2,710,112 | 6/1955 | Thompson | 220/405 |
| 2,736,453 | 2/1956 | Russell . | |
| 2,947,458 | 8/1960 | Troendly | 294/32 |
| 3,194,429 | 7/1965 | Bouet . | |
| 3,199,720 | 8/1965 | Forman | 294/27.1 |
| 3,647,077 | 3/1972 | Gillespie . | |
| 3,779,231 | 12/1973 | Anderson | 229/1.5 H |
| 3,782,976 | 1/1974 | Maier | 229/3.5 MF |
| 4,717,038 | 1/1988 | Anders . | |

FOREIGN PATENT DOCUMENTS 860210 1/1961 United Kingdom ............ 229/1.5 H

OTHER PUBLICATIONS

Ensar catalog, pp. 14 and 15 (date unknown).

*Primary Examiner*—George E. Lowrance
*Attorney, Agent, or Firm*—Dressler, Goldsmith, Shore, Sutker & Milnamow, Ltd.

[57] ABSTRACT

An aluminum foil oven pan and a wire holding frame therefor is disclosed. The holding frame comprises generally co-planar pan support portions extending beneath the bottom wall of the pan. The pan support portions have upwardly extending lateral portions for restraining the side wall of the pan. Some of the portions terminate in retaining members for being bent over to grip the pan rim. Other portions are provided with handle means whereby a retained pan may be easily lifted with the holding frame so that the user need not touch the pan during cooking procedures and whereby the risk of buckling the pan and spilling the contents therefrom is eliminated.

9 Claims, 3 Drawing Sheets

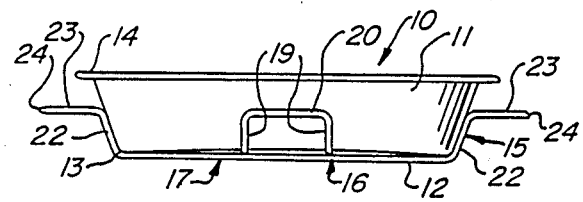
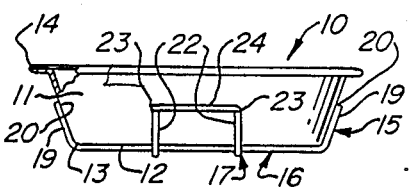
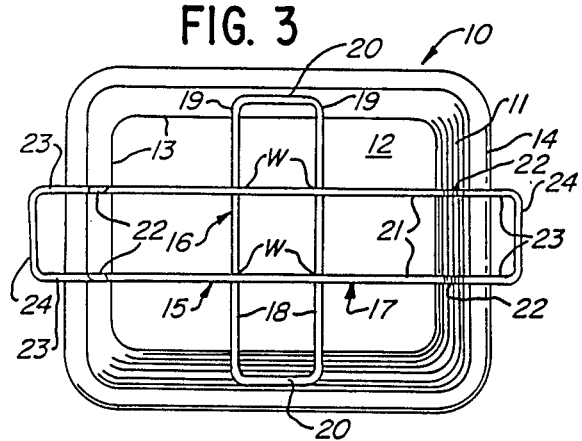
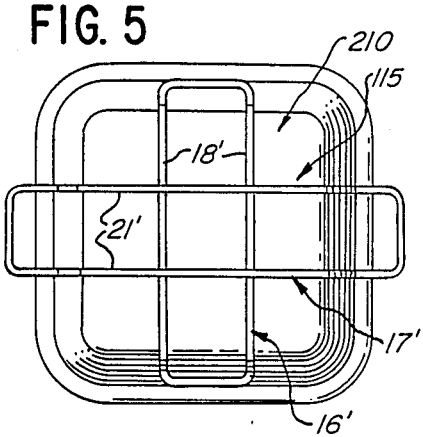
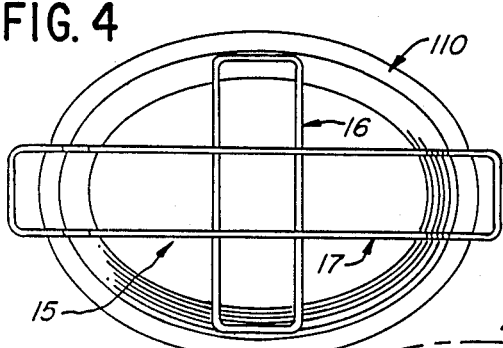
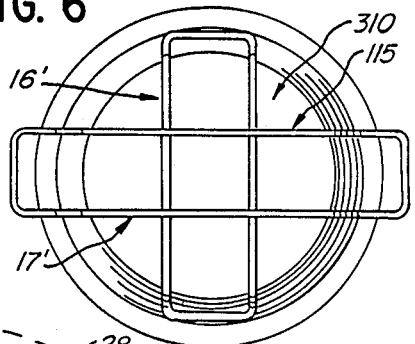
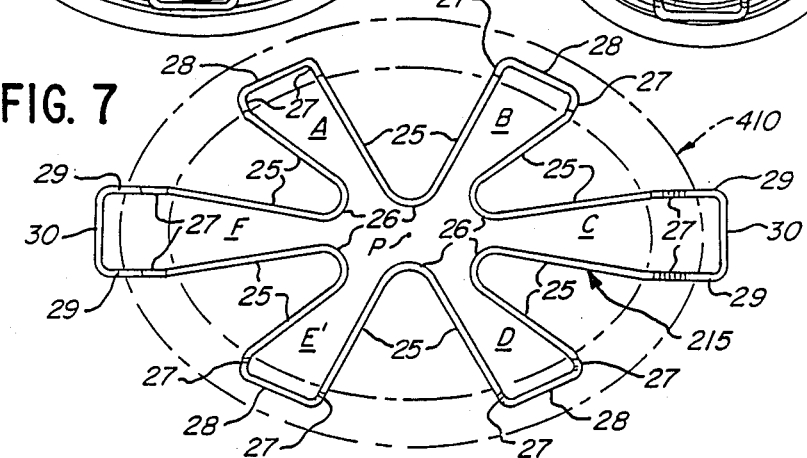

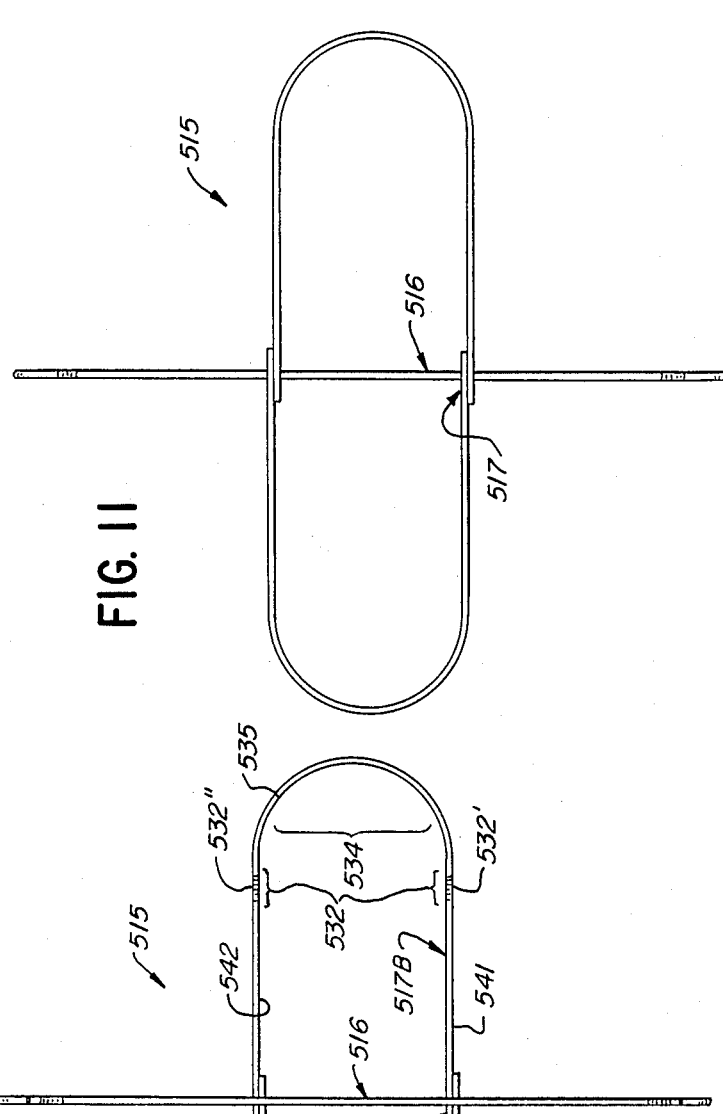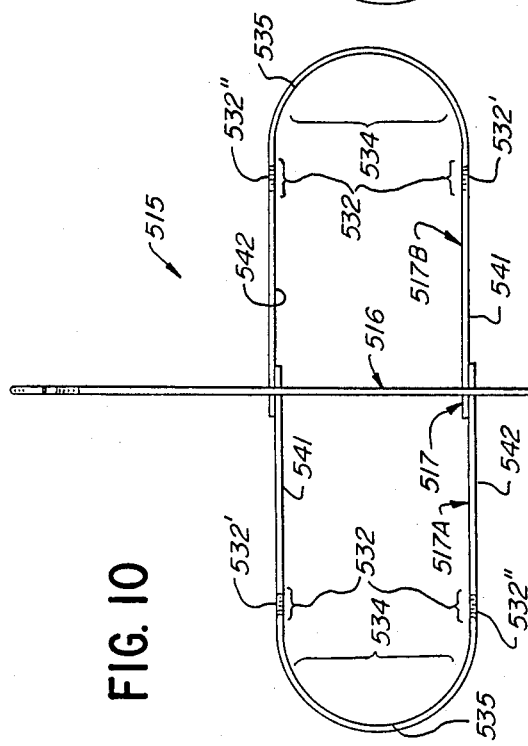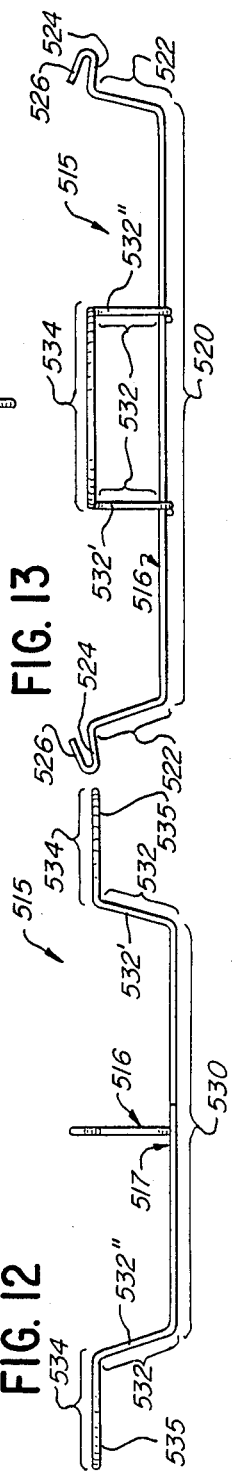

OVEN PAN HOLDER AND COMBINATION OF OVEN PAN HOLDER WITH OVEN PAN

CROSS-REFERENCE TO RELATED APPLICATION

This is a continuation-in-part application of copending U.S. patent application Ser. No. 603,781 filed Apr. 25, 1984 now U.S. Pat. No. 4,817,812, issued Apr. 4, 1989 by Norton Sarnoff and Carl F. Fletcher and assigned to the assignee of the present invention.

TECHNICAL FIELD

The invention relates to a holding frame for an oven pan, particularly an aluminum foil pan.

BACKGROUND OF THE INVENTION

Aluminum foil pans are widely used for cooking since they are very efficient in quickly distributing heat and are also inexpensive, thus making them disposable. A wide variety of shapes and sizes of aluminum pans have been developed for use with food items baked in an oven. Generally, such pans have an upper curled-over lip which adds a degree of rigidity and strength to the pan. Also, stamped crease lines are provided in both the bottom wall and side wall of the pan for additional reinforcement. However, due to the relatively thin and flimsy nature of the aluminum gauges commonly used, such reinforcement still fails to prevent the pan from buckling or twisting as the user carries the filled pan to or from the oven.

A significant buckling problem is found with pans that are intended for use in baking heavier items, such as turkeys, hams, roasts, etc. This problem is particularly acute when the baking process has ended and the user attempts to extract the pan from the oven when it is very hot. If there are liquids in the pan, such as cooking juices, gravy and the like, the user must take great care to prevent spillage, as well as avoiding burning the hands. Oftentimes, two people must attempt to grasp opposite ends of an aluminum pan and hold it level during transport from the oven.

It would be desirable to provide a holder or rack for supporting a disposable-type metal foil pan. Further, it would be advantageous if such a holder could be readily engaged with such a pan to form a combined cooking utensil. It would be beneficial if the pan were supported on both its bottom wall and side wall, and it would be beneficial if such support could be provided at a variety of places around the pan. For example, with a rectangular pan having four sides, it would be desirable to support the pan on all four sides.

SUMMARY OF THE INVENTION

In a preferred form of the present invention, a holding frame is provided for use with a metal foil oven pan of the type having a bottom, a side wall extending upwardly from the periphery of the bottom, and a rim extending outwardly from the upper periphery of the side wall, and the holding frame may be engaged with the oven pan so as to define, in combination, a cooking utensil in which the oven pan is retained in, and not intended to be removed from, the holding frame.

In a preferred form of the holding frame, the frame comprises first and second wire frame sections arranged transversely to each other. The first and second frame sections are rigidly connected to each other where the sections cross.

In a preferred embodiment of the holding frame, the first frame section is a single piece of wire, and the second frame section comprises two separate pieces of wire each connected to the first frame section. The two pieces of wire comprising the second frame section are identical in configuration. Thus, from a manufacturing standpoint, only two configurations of wire pieces need be produced.

The first frame section has (1) a central support region for supporting the bottom of the oven pan, (2) an upwardly extending arm at each end of the central support region capable of horizontally restraining the oven pan side wall, (3) a peripheral lower engaging member extending horizontally outwardly from each arm to engage the lower surface of the pan rim, and (4) an upper retaining member extending from the lower engaging member for being reversely bent over the top surface of the pan rim to grip the rim between the lower engaging member and the upper retaining member.

The second frame section has (1) a central support region for supporting the bottom of the oven pan, (2) at least one upwardly extending arm at each end of the second frame section central support region capable of horizontally restraining the oven pan side wall, and (3) a handle means at the end of each second frame section arm extending sufficiently outwardly for being gripped when the pan is carried on the frame.

In a preferred embodiment, the single piece of wire for the first frame section and the two identical pieces of wire for the second frame section are easily assembled and connected together by welding, and the ends of the first frame section single piece of wire are easily bent or crimped over the foil oven pan that is placed on the holding frame.

Numerous other advantages and features of the present invention will become readily apparent from the following detailed description of the invention, from the claims, and from the accompanying drawings.

BRIEF DESCRIPTION OF THE DRAWINGS

The invention is described in greater detail in the following description of the preferred embodiments, taken in conjunction with the drawings, in which:

FIG. 1 is a side view of a rectangular aluminum oven pan supported in a first embodiment of the metal wire holding frame in accordance with the invention of the parent application;

FIG. 2 is an end view of the combination shown in FIG. 1;

FIG. 3 is a bottom view of the combination shown in FIG. 1;

FIG. 4 is a bottom view of an oval-shaped aluminum oven pan supported in the metal wire holding frame shown in FIGS. 1-3;

FIG. 5 is a bottom view of a square-shaped aluminum oven pan retained by a second embodiment of the metal wire holding frame of the invention of the parent application;

FIG. 6 is a bottom view of a circular oven pan being supported by the holding frame shown in FIG. 5;

FIG. 7 is a bottom view of a large-sized oval oven pan supported by a one-piece metal wire holding frame in a third embodiment of the invention of the invention of the parent application;

FIG. 10 is a top plan view of the holding frame used in the combination illustrated in FIGS. 8 and 9, but with the frame shown in the pre-formed, unassembled condition prior to the retaining members being deformed or crimped down against the rim of the oven pan;

FIG. 11 is a bottom plan view of the holding frame of FIG. 10;

FIG. 2 is a side view of the holding frame of FIG. 10; and

FIG. 13 is an end view of the holding frame of FIG. 10.

DETAILED DESCRIPTION

Figure 8:
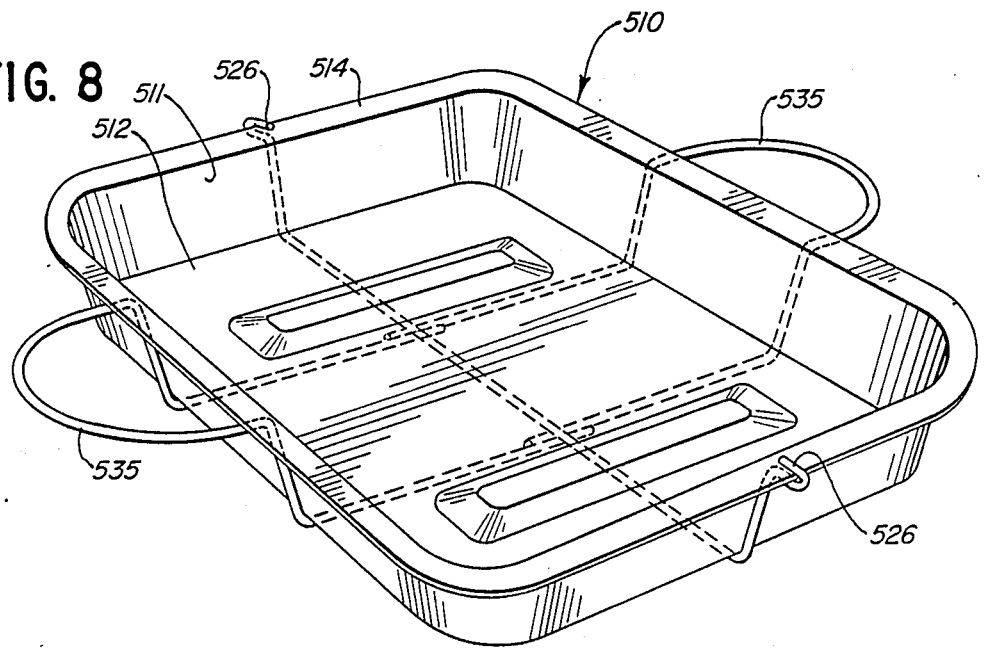
FIG. 8 is a perspective view of an embodiment of the holding frame of the present invention shown retaining a rectangular metal foil oven pan in combination therewith.

With reference to FIGS. 1–3, it will be seen that a conventional rectangular metal foil (e.g., aluminum) oven pan 10 is shown. Pan 10 includes a continuous side wall 11 formed integrally with a generally flat bottom wall 12 along the peripheral edge 13 of the bottom. For extra rigidity in handling the pan, a rolled-over lip 14 extends around the upper edge of the side wall 11, as best seen in FIG. 2. Pan 10 comprises a relatively thin-gauged stamped sheet of aluminum which allows it to very quickly and evenly distribute heat, while at the same time being very inexpensive and thus disposable.

Pan 10 is provided with, in combination, a first embodiment of a wire holding frame 15 which ably supports the pan for transport into and out of an oven. In this embodiment of the invention of the parent application, frame 15 is a two-sectioned structure having a first section 16 fixedly connected to a transverse second section 17. Section 16 has parallel spaced-apart portions 18 which terminate at their opposite ends in upwardly extending end portions 19. Portions 20 connect the ends of upwardly bent end portions 19 and are arranged generally transverse to portions 18. The upwardly bent end portions 19 and connecting portions 20 form lateral retaining means for the side wall 11 of the pan. As best viewed in FIG. 2, portions 19 extend upwardly along side wall 11 for greater than one-half of its height and are bent at substantially the same angle that side wall 11 extends from bottom 12 in order to provide flush abutting contact with and lateral support for the pan side wall.

Second section 17 of frame 15 is arranged to centrally cross section 16 at generally right angles thereto. In like manner, section 17 includes two parallel spaced-apart wire portions 21 which terminate at their opposite ends in upwardly bent portions 22. The bent portions 22 slope upwardly again generally at the same angle as the side wall 11 ut further include re-bent portions 23 which project outwardly of frame 15 in a substantially horizontal plane as shown in FIG. 1. The ends of the horizontal portions 23 are integrally connected by transverse portions 24 and provide opposite handle means for the frame.

Welds w fixedly connect the parallel spaced-apart wire sections 18 and 21 which are support members for the pan bottom 12. Due to the flexible and deformable nature of aluminum foil, when sufficient food is placed into pan 10, the bottom 12 might deflect downwardly if one were to attempt to carry the pan in the conventional manner. Frame 15 avoids this by supportively retaining bottom 12 across the portions 18 and 21, as shown in FIGS. 1 and 2.

Thus, frame 15 offers horizontal constraint by means of the upwardly bent portions of the frame and vertical support by means of the support portions 18 and 21. This arrangement facilitates the easy maneuvering of pan 10 when it is loaded with food. One person simply grasps transverse portions 24, or handle means, and lifts the pan to the desired location.

With reference to FIG. 4, it will be understood that an oval-shaped pan 110 may also be used with frame 15. Section 16 extends across the short axis of the oval shape, while section 17 resides along the long axis thereof.

With reference next made to FIG. 5, it will be appreciated that frame 115 is provided for a square-shaped aluminum foil pan 210. In this embodiment of the invention of the parent application, frame 115 includes equal length sections 16' and 17' having, respectively, parallel spaced-apart wire portions 18' and 21' also of equal length. Section 17' is provided with handle means projecting outwardly from its upwardly bent portions in substantially the same manner as frame 15.

In FIG. 6, a circular-shaped aluminum foil pan 310 is provided in combination with frame 115 as described in FIG. 5. The diameter of the pan bottom is substantially of the same dimension as the length and width of the square pan 210, whereby sections 16' and 17' extend generally along two transverse diameters of the circular shape.

It will be understood, with respect to frames 15 and 115 shown in FIGS. 1–6, that a modification of sections 16, 16' and 17, 17' may be provided to accommodate various sizes of pans. For pans of different side wall heights, the upwardly bent portions at the ends of the wire portions 18, 21 and 18', 21' may be shortened or lengthened to thereby offer lateral restraint along a major portion of the height of a side wall. Additionally, the length of the wire portions 18, 18', 21 and 21' may be varied to accommodate an infinite variety of pan bottom sizes.

With reference now made to FIG. 7, another embodiment for the holding frame of the invention of the parent application is shown and comprises a single wire loop frame 215. Frame 215 is formed to provide a holding frame for an oval pan 410, as shown. In this regard, frame 215 comprises individual loop segments A, B, C, D, E and F. Each segment includes two straight wire portions 25 which are integrally connected by curved connecting portions 26. In this embodiment, the straight portions 25 all extend in generally radial directions passing through the center point P of oval pan 410. However, the continuous wire loop frame 25 may be provided in a variety of configurations and is not intended to be limited to the embodiment illustrated.

At the peripheral edge of the pan bottom, the straight portions 25 terminate thereat in upwardly bent portions 27, in similar manner to those as described for frames 15 and 115. The upwardly bent portions 27 of loop segments A, B, E and D are connected by transverse connecting portions 28. Loop segments C and F are arranged generally along the long axis of the oval. Segments C and F are provided with handle means wherein their upwardly bent portions 27 are re-bent to form outwardly projecting portions 29 which are integrally connected by transverse handle portions 30. Straight and curved wire portions 25 and 26 of loop segments A-F are arranged in co-planar relationship and provide support for the pan bottom as would be clear. The upwardly bent portions 27 provide lateral restraints for the side wall of pan 410. Frame 215 is very useful with large-sized oval pans, such as those having a long axis length of 18 inches or more, and a shorter axis length of 12 inches or more. Such type pans are used for baking large items such as turkeys.

Frame 215 is not limited to use with oval-shaped pans and, for example, may be shaped for accommodating circular pans whereby the individual loop portions A-F would all have substantially the same dimensions. A continuous single wire holding frame is also envisioned for square and rectangular pans wherein four loop segments are provided arranged at 90° therebetween.

It is further to be understood that frames 15 and 115 may be provided with pan support sections which do not all cross. For example, a plurality of sections 16 can be provided in parallel relationship, with each one crossing section 17 at a different location. Also, with reference to FIG. 6, frame 115 can be provided with more than two sections that radially extend from the center of pan 310.

It will be understood that the holding frame is not limited to use with flat-bottom pans and, while the embodiments illustrated have two opposing handle means, handle means can be provided at more than just two upwardly bent portions of the frame.

According to the embodiments of the invention of the parent application, a metal foil oven pan with a holding frame has been provided which can be re-used with a succession of oven pans, allowing the predecessors to be discarded after cooking. The pans are securely supported in the vertical direction and are laterally restrained to afford a very efficient carrying means for the pans. That permits one person to easily carry a hot pan from the oven without the need of grasping the hot pan itself and run the risk of deforming the pan and spilling the food contents therefrom.

Figure 9:
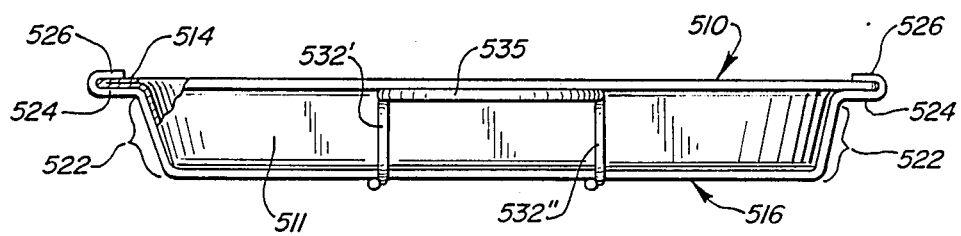
FIG. 9 is a side view of the combination shown in FIG. 8 with a left-hand corner portion broken away and shown in cross-section.

FIGS. 8-13 illustrate an embodiment of the holding frame of the present invention for use in combination with a foil oven pan to form a cooking utensil in accordance with another aspect of the invention as illustrated in FIGS. 8 and 9. The holding frame is designated generally by reference numeral 515 in FIGS. 10-13 wherein the frame 515 is shown in the pre-formed, unassembled condition. It is adapted to receive a metal foil oven pan 510 (FIGS. 8 and 9) and then be deformed to retain the pan as illustrated in FIGS. 8 and 9.

The pan 510 is substantially identical to the pan 10 illustrated in FIG. 1 and is of the type that includes a bottom wall 512, a side wall 511 extending upwardly from the periphery of the bottom wall 512, and a rim 514 extending outwardly from the upper periphery of the side wall 511. In the form of the pan 510 illustrated, the rim 514 is a lip which comprises a rolled-over edge section of the foil pan.

With reference to FIGS. 10-13, the holding frame 515 includes a first wire frame section 516 and a second wire frame section 517. The first frame section 516 is arranged transversely to the second frame section 517. The first frame section 516 may be a single piece of wire as illustrated, and the second frame section 517 may actually consist of two separate pieces of wire 517A and 517B. The configuration of the wire piece 517A is preferably identical to the configuration of the wire piece 517B to simplify manufacturing and reduce manufacturing costs.

The first frame section 516 can be characterized as having a central support region 520 (FIG. 13 only) for supporting the bottom of the oven pan. The first frame section 516 can further be characterized as having an upwardly extending arm 522 (FIG. 13 only) at each end of the central support region 520, and the arms 522 are capable of horizontally restraining the oven pan side walls.

The first frame section 516 also has a peripheral lower engaging member 524 (FIGS. 9 and 13) extending substantially horizontally outwardly from each arm 522 to engage the lower surface of the pan rim 514. An upper retaining member 526 extends from each lower engaging member 524 (as best illustrated in FIG. 13) for being reversely bent over the top surface of the pan rim 514 (as best illustrated in FIG. 9) to grip the rim 514 between the lower engaging member 524 and the upper retaining member 526.

In the preferred form of the fourth embodiment of the frame 515 illustrated in FIGS. 8-13, the second frame section 517 comprises the two separate, but identical, wire pieces 517A and 517B as previously noted. Each wire piece 517A and 517B includes two spaced-apart, generally parallel and coplanar, first and second support portions 541 and 542, respectively. The two wire pieces 517A and 517B are arranged to extend in opposite directions from the first frame section 516 so that a length of the first support portion 541 of the piece 517A lies adjacent a length of the second support portion 542 of the piece 517B and so that a length of the second support portion 542 of the piece 517A lies adjacent a length of the first support portion 541 of the piece 517B. The first and second support portions 541 and 542 of each of the two pieces 517A and 517B of the second frame section 517 together define a central support region 530 (FIG. 12) of the second frame section 517. The central support region 530 supports the bottom of the oven pan. In the preferred form of the holding frame illustrated in FIGS. 10-13, the individual support portions 541 and 542 of the central support region 530 cross under the central support region 520 of the first frame section 516.

Each wire piece 517A and 517B further includes (1) a first arm member 532' extending upwardly from the second frame section first support portion 541 and (2) a second arm member 532" extending upwardly from each second support portion 542. At each end of the second frame section 517, the two spaced-apart, parallel arm members 532' and 532" together may be characterized as defining a second frame section main arm 532 (FIG. 12).

The arm members 532' and 532" of the main arms 532 can be alternatively characterized as consisting of the elongated middle portion of double-bent extensions of the central support region wire portions (541 or 542) in which the extensions are first bent upwardly to define the arm members 532' and 532" and are secondly rebent outwardly into a plane generally parallel to the plane of the central support region wire portions 541 and 542. The arms 532 (which each comprise arm members 532' and 532") are capable of horizontally restraining the oven pan side wall.

Each of the second frame section wire pieces 517A and 517B further includes an arcuate member 535 connecting the outer ends of the associated arm members 532' and 532" in a plane generally parallel to the plane of the support portions 541 and 542. The arcuate member 535 may lie in a plane immediately below, or substantially below, the plane of the pan rim. The arcuate member 535, along with its unitary connection to the arm members 532' and 532", forms a handle means 534.

In the embodiment of the holding frame illustrated in FIGS. 8–13, the two separate wire pieces 517A and 517B are preferably welded to the first frame section 516. FIG. 10 shows where the first support portion 541 of the first piece 517A crosses, and is welded to, the first frame section 516. The first support portion 541 of the first piece 517A is also seen to be contiguous with the second support portion 542 of the second piece 517B of the second frame section 517. The contiguous support portions 541 and 542 may also be welded together, if desired, in addition to being welded to the first frame section 516.

Similarly, where the second support portion 542 of the first piece 517A of the second frame section 517 crosses, and is welded to, the first frame section 516, the second support portion 542 is contiguous with the first support portion 541 of the second piece 517B of the second frame section 517.

Although not illustrated, the first portion 541 of each wire piece 517A or 517B may be spaced from the adjacent second support portion 542 of the other wire piece.

Further, although not illustrated, the first wire piece 517A and the second wire piece 517B may be replaced by a single, unitary piece to form the second frame section 517.

The embodiment of the holding frame 515 illustrated in FIGS. 8–13, provides good support for a foil oven pan because the pan is supported at a plurality of regions across the pan bottom and along the pan sides. When a rectangular pan is used with the holding frame as illustrated in FIGS. 8 and 9, the rectangular pan is seen to be supported generally at four sides of the pan. An oval pan would similarly be supported at a plurality of regions on its bottom and around its sides by such a holding frame 515 (generally analogous to the support of the oval pan 110 illustrated in FIG. 4 for the first embodiment of the holding frame).

The pan is securely retained on the holding frame by means of the retaining members 526 which are deformed down against, or crimped against, the pan rim. This combination is easily fabricated without the use of separate fastening members or separate retaining members.

Further, the preferred form holding frame 515 illustrated in FIGS. 8–13 can be easily fabricated since the second frame section 517 consists of two wire pieces, each having an identical configuration, which are then easily welded to the one other piece—the first frame section 516.

The combination utensil consisting of the holding frame 515 and an oven foil pan 510 is easily fabricated by placing a foil pan 510 on the frame and then crimping the frame retaining members 526 down into engagement with the pan rim to securely retain the pan in the holding frame.

While particular embodiments of the present invention have been disclosed, it is understood that a broad range of equivalent configurations falls within the scope of the invention and the claims appended hereto.

What is claimed is:

1. A cooking utensil comprising, in combination:
   a metal foil oven pan of the type having a bottom, a side wall extending upwardly from the periphery of the bottom, and a rim extending outwardly from the upper periphery of the side wall; and
   a wire frame holding said pan, said frame including first and second wire frame sections arranged transversely to each other and being rigidly connected to each other where said sections cross;
   said first frame section having
   (1) a central support region for supporting the bottom of said oven pan,
   (2) an upwardly extending arm at each end of the central support region adjacent, and capable of horizontally restraining, said oven pan side wall,
   (3) a peripheral lower engaging member extending horizontally outwardly from each arm to support engage the lower surface of said pan rim, and
   (4) an upper retaining member extending from each said lower engaging member and being reversely bent over the top surface of said pan rim to grip said rim between said lower engaging member and said upper retaining member; and
   said second frame section having
   (1) a central support region for supporting the bottom of said oven pan,
   (2) at least one upwardly extending arm at each end of the second frame section central support region adjacent, and capable of horizontally restraining, said oven pan side wall, and
   (3) a handle means at the end of each said second frame section arm extending sufficiently outwardly of said pan rim for being gripped.

2. The cooking utensil in accordance with claim 1 in which said second frame section includes two separate, but identical, wire pieces welded to said first frame section.

3. A holding frame for use with a metal foil oven pan of the type having a bottom, a side wall extending upwardly from the periphery of the bottom, and a rim extending outwardly from the upper periphery of the side wall, said frame comprising:
   first and second wire frame sections arranged transversely to each other and being rigidly connected to each other where said sections cross;
   said first frame section having (1) a central support region for supporting the bottom of the oven pan, (2) an upwardly extending arm at each end of the central support region capable of horizontally restraining the oven pan side wall, (3) a peripheral lower engaging member extending horizontally outwardly from each arm to engage the lower surface of said pan rim, and (4) an upper retaining member extending from said lower engaging member for being reversely bent over the top surface of said pan rim to grip said rim between said lower engaging member and said upper retaining member; and
   said second frame section including two separate, but identical, oppositely extending wire pieces connected to said first frame section; each said second frame section wire piece including a pair of spaced-apart and generally parallel central support portions disposed in a first plane for supporting the bottom of the oven pan; said second frame section wire pieces each including opposite outward ends bent upwardly from said central support portions to form opposite pairs of upwardly extending arm members capable of horizontally restraining the side wall of the oven pan; said second frame section wire pieces each further including two outwardly directed re-bent portions that (1) each extend from a separate one of said arm members, (2) lie in a second plane that is generally parallel to said first plane and that is lower than the top plane of said pan side wall, and (3) are connected by a length of wire to form handle means which extend sufficiently outwardly for being gripped when the pan is carried on the frame.

4. A holding frame for use with a metal foil oven pan of the type having a bottom, a side wall extending upwardly from the periphery of the bottom, and a rim extending outwardly from the upper periphery of the side wall, said frame comprising:

first and second wire frame sections arranged transversely to each other and being rigidly connected to each other where said sections cross;

said first frame section having (1) a central support region for supporting the bottom of the oven pan, (2) an upwardly extending arm at each end of the central support region capable of horizontally restraining the oven pan side wall, (3) a peripheral lower engaging member extending horizontally outwardly from each arm to engage the lower surface of said pan rim, and (4) an upper retaining member extending from said lower engaging member for being reversely bent over the top surface of said pan rim to grip said rim between said lower engaging member and said upper retaining member; and said second frame section having parallel, spaced-apart wire portions crossing said first frame section at generally right angles, said first and second frame sections being fixedly connected at the points of crossing in a first plane; said second frame section wire portions defining a central support region for supporting the oven pan bottom and terminating at opposite ends in double-bent extensions firstly being bent upwardly to define arm members providing lateral restraint for the side wall of the pan and secondly being re-bent outwardly into a plane generally parallel to said first plane; said second frame section wire portions having transverse regions integrally joining the re-bent extensions at either end and forming frame handle means therewith for being exposed at opposite sides of the oven pan.

5. The holding frame in accordance with claim 4 in which said second frame comprises a first unitary piece of wire and a second, but separate, unitary piece of wire; said first and second wire pieces each having an identical configuration; said wire pieces being arranged to extend in opposite directions from said first frame section; and each said wire piece defining two of said spaced-apart wire portions.

6. A holding frame for use with a metal foil oven pan of the type having a bottom, a side wall extending upwardly from the periphery of the bottom, and a rim extending outwardly from the upper periphery of the side wall, said frame comprising:

first and second wire frame sections arranged transversely to each other and being rigidly connected to each other where said sections cross;

said first frame section having (1) a central support region for supporting the bottom of the oven pan, (2) an upwardly extending arm at each end of said central support region capable of horizontally restraining the oven pan side wall, (3) a peripheral lower engaging member extending horizontally outwardly from each arm to engage the lower surface of said pan rim, and (4) an upper retaining member extending from said lower engaging member for being reversely bent over the top surface of said pan rim to grip said rim between said lower engaging member and said upper retaining member; and said second frame section having (1) a central support region for supporting the bottom of the oven pan, (2) at least one upwardly extending arm at each end of the second frame section central support region capable of horizontally restraining the oven pan side wall, and (3) a handle means at the end of each said second frame section arm extending sufficiently outwardly for being gripped when the pan is carried on the frame.

7. The holding frame in accordance with claim 6 in which said first frame section is a single piece of wire and in which said second frame section comprises two separate pieces of wire each connected to said first frame section.

8. The holding frame in accordance with claim 6 in which said first frame section is welded to said second frame section.

9. The holding frame in accordance with claim 6 in which said second frame section comprises two separate, but identical, wire pieces; each said second frame section wire piece including two spaced-apart and generally parallel first and second support portions; said two wire pieces of said second frame section being arranged to extend in opposite directions from said first frame section with a length of the first support portion of one piece lying adjacent a length of the second support portion of the other piece and with a length of the second support portion of the one piece lying adjacent a length of the first support portion of the other piece whereby said first and second support portions of each of said two pieces of said second frame section together define said central support region of said second frame section; each said wire piece further having a first arm member extending upwardly from said second frame section first support portion and having a second arm member extending upwardly from each said second frame section second support portion; said two arm members of each wire piece of said second frame section together defining one of said second frame section arms; each said second frame section wire piece further including an arcuate member connecting the outer ends of the associated second frame section arm members in a plane generally parallel to said second frame section support portions and forming said handle means wherein said support members, arm members, and arcuate member of one of said two wire pieces of said second frame section together define a unitary, continuous length of wire that is separate from the support members, arm members, and arcuate member of the other of said two wire pieces of said second frame section.

* * * * *

UNITED STATES PATENT AND TRADEMARK OFFICE
CERTIFICATE OF CORRECTION

PATENT NO. : 4,852,760

DATED : August 1, 1989

INVENTOR(S) : Norton Sarnoff and Carl R. Fletcher

It is certified that error appears in the above-identified patent and that said Letters Patent is hereby corrected as shown below:

IN THE BRIEF DESCRIPTION OF THE DRAWINGS:

Column 3, line 13, change the number "2" to number --12--.

Signed and Sealed this

Twelfth Day of June, 1990

Attest:

HARRY F. MANBECK, JR.

*Attesting Officer*          *Commissioner of Patents and Trademarks*